Figure 5:
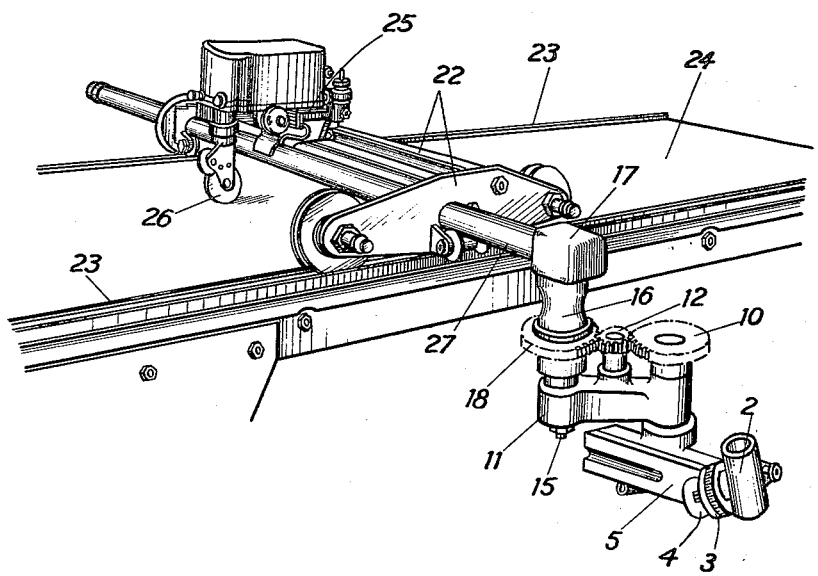

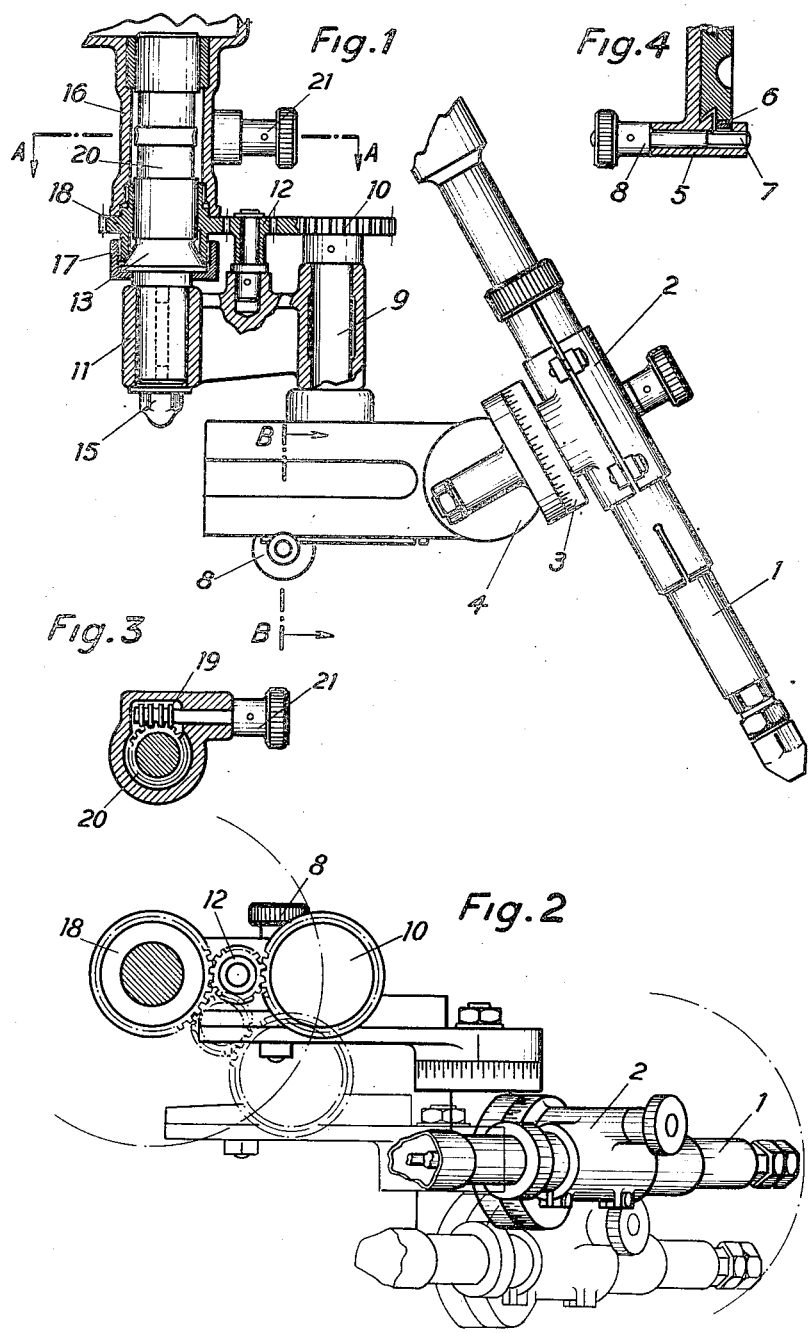

Feb. 26, 1952 G. GATIMEL 2,587,461
DEVICE FOR THE ADJUSTMENT OF THE STARTING POSITION
OF THE BLOWPIPE IN OXYGEN-CUTTING MACHINES
Filed June 11, 1948 2 SHEETS—SHEET 2

INVENTOR
G. GATIMEL
By: Young, Emery & Thompson
Attys.

Patented Feb. 26, 1952

2,587,461

UNITED STATES PATENT OFFICE 2,587,461

DEVICE FOR THE ADJUSTMENT OF THE STARTING POSITION OF THE BLOW-PIPE IN OXYGEN CUTTING MACHINES

Gilbert Gatimel, Paris, France, assignor to L'Air Liquide, Societe Anonyme pour l'Etude et l'Exploitation des Procedes Georges Claude, a company Application June 11, 1948, Serial No. 32,486
In France July 16, 1947

2 Claims. (Cl. 266—23)

My invention deals with improvements introduced, in oxygen cutting machines, to the device for the micrometric adjustment of the horizontal advance of the blowpipe so as to bring it into a position for attacking the sheet-metal at a fixed point; these are machines that are provided, as a rule, with carriages travelling at right angles on a table and with tracer devices, and in which the adjustment considered causes the end of the blowpipe to travel along paths that are a combination of straightlined and rotary movements; in these standard devices for adjustment, the blowpipe, when it is sloped for the purpose of carrying out bevel cuts, generates in its rotary movement at the time of its adjustment the geometrical surface of a circular cone having as its vertex the point of intersection of the axis of the blowpipe with the rotary axis of the device for circular adjustment.

When a straight line bevel cut is made the axis of the blowpipe moves in a plane the angle of which with the upper face of the metal to be cut determines the angle of the bevel cut in the plate. For a given direction of the straight line bevel cuts, such an angle varies according to the position of the blow torch axis in the geometrical surface of the above circular cone. It is null when the plane determined by the blow torch axis and the geometrical axis of the circular cone mentioned above contains the straight line to be followed for cutting on the upper face of the metal plate to be cut, it has its greatest value when said plane is at right angle with said straight line. It results therefrom that the correct adjustment of the blow torch at the starting point of a straight line bevel cutting for a predetermined angle of the bevel may only be effected by an irksome system of trial and error.

In accordance with the present invention, this drawback is eliminated by replacing the ordinary device for circular adjustment with a device that, during the circular movement of adjustment of the blowpipe, holds the latter parallel to itself, instead of causing its convergence towards a fixed point (the vertex of the cone referred to above), the ideal surface that it generates when it is sloped for cutting on the bevel being no longer a circular cone, but a slanting cylinder. The device for carrying into effect the invention comprises a toothed wheel keyed on a vertical rotary spindle worked by hand and engaging, through a wheel that is set loose and has an indifferent number of teeth, with a planet wheel possessing the same number of teeth as the first one and keyed on the vertical spindle to which is fastened the guide that gives the rectilinear advance movement.

In the accompanying drawings that illustrate, as an example, an apparatus for carrying out the invention when adapted to an oxygen-cutting machine traveling on a table, Fig. 1 is a general elevational view of the assembly set at the end of the frame connecting the tracer to the blowpipe with part section of the hand control of the device for circular adjustment; Fig. 2 is a plan corresponding to Fig. 1, with the fine lines showing the device brought into any particular position; Fig. 3 is a section along the line AA of Fig. 1, and shows the hand control for the movement of circular advance; Fig. 4 is a section through the line BB of Fig. 1, showing the hand control for the movement of rectilinear advances; Figure 5 is a perspective view showing the device according to the invention adapted to an oxygen-cutting machine, the blow pipe being omitted.

The blowpipe 1 (see Fig. 1) sliding for the vertical advance in the sleeve 2, may be sloped in vertical planes at an angle equal to that of the bevels to be obtained that may be checked by the scale appearing on the rotary drums 3 and 4. This sleeve 2 provided with drums slides in a guide 5 through the toothed rack 6 (see Fig. 4) operated by a pinion 7 keyed on the hand wheel spindle 8. On the spindle 9 (see Fig. 1) fixed rigidly with the slide 5, is keyed a planet-wheel 10 possessing a certain number of teeth. The spindle 9 may pivot on an arm 11 on which turns loose an idle intermediary wheel 12 having any number of teeth, moreover the arm 11 is keyed on a shouldered centering spindle 13 and held thereon by a nut 15. The spindle 13 goes into the sleeve 16 of the box 17 secured on the transverse carriage of an oxygen cutting machine as shown in Figure 5. Such a machine is of a well known type and comprises a first carriage 22 adapted to run along parallel rails 23 provided on a fixed frame or horizontal table 24. A second carriage 25 is mounted on the first carriage 22 and adapted to be moved relatively to said first carriage in a direction at right angle with the rails 23. The second carriage 25 includes a propelling unit and the usual tracer devices. A tracing and propelling wheel is indicated at 26 and said propelling unit is secured on a hollow rod 27 adapted to slide in bearings of the lateral members of the frame of the carriage 23. The box 17 is secured to one end of said hollow rod 27 and the spindle 13 is supported in the sleeve 16 by a milled ring 17 screwed on said sleeve 16.

At its lower end is keyed a fixed toothed wheel 18 with the same number of teeth as the planet-wheel 10; the three wheels 18, 12 and 10 of this assembly are always in mesh. The spindle 13 is driven in rotation by a worm 19 (see Fig. 3) operating the tangent wheel 20 fixed rigidly with the spindle 13 (see Fig. 1) and the worm 19 is controlled by the hand wheel 21.

What I claim is:

1. In a sheet metal oxygen cutting machine, in combination, a carriage adapted to be moved in a direction parallel to the surface of the sheet metal to be cut, an arm provided with a spindle journalled on the carriage at right angle to said surface, a combined support for a blowpipe provided with a spindle journalled at the end of said arm and at right angle to said surface, a stationary gear mounted on said carriage concentric with the pivoting arm spindle, a gear secured to the combined support spindle, and an intermediary gear adapted to freely rotate on said arm and meshing with the first mentioned gears so as to turn the combined support relatively to the arm of an angle equal to the rotation angle of said arm, but in a reverse direction.

2. In a sheet metal oxygen cutting machine, in combination a carriage adapted to be moved in a direction parallel to the surface of the sheet metal to be cut, an arm provided with a spindle journalled on the carriage at right angle to said surface, a slide member provided with a spindle journalled at the end of said arm in order to revolve about an axis parallel to the axis of the arm spindle, a stationary gear mounted on the carriage concentric with said arm spindle, a gear secured to the slide member spindle and having the same number of teeth as said stationary gear, an intermediary gear adapted to freely rotate on said arm and meshing with said gear, a sliding member adapted to slide in the slide member, a drum adapted to revolve on said sliding member about an axis at right angle with the axis of both spindles, a second drum adapted to revolve relatively to the first one about an axis at right angle parallel to the plane containing the axis of both spindles, and a sleeve provided on said second drum adapted to slidably support a blowpipe.

GILBERT GATIMEL.

REFERENCES CITED

The following references are of record in the file of this patent:

UNITED STATES PATENTS

| Number | Name | Date |
| --- | --- | --- |
| 2,183,605 | Bucknam et al. | Dec. 19, 1939 |
| 2,211,224 | Anderson | Aug. 13, 1940 |
| 2,448,089 | Duvall | Aug. 31, 1948 |

FOREIGN PATENTS

| Number | Country | Date |
| --- | --- | --- |
| 249,976 | Great Britain | Apr. 8, 1926 |